United States Patent [19]

Yamanis

[11] Patent Number: 4,845,056
[45] Date of Patent: Jul. 4, 1989

[54] CONTINUOUS PROCESS FOR PRODUCTION OF FINE PARTICULATE CERAMICS

[75] Inventor: Jean Yamanis, Morristown, N.J.

[73] Assignee: Allied-Signal Inc., Morristown, N.J.

[21] Appl. No.: 106,827

[22] Filed: Oct. 9, 1987

[51] Int. Cl.$^4$ .............................................. C04B 35/01
[52] U.S. Cl. ..................................... 501/12; 501/94;
501/103; 501/153; 501/152; 264/82; 264/83;
423/DIG. 11
[58] Field of Search .................... 501/12, 94, 103, 153,
501/152; 264/82, 83; 423/DIG. 11

[56] References Cited

U.S. PATENT DOCUMENTS 4,297,250 10/1981 Gupta et al. ..................... 264/104 X
4,687,510 8/1987 Chaney et al. ..................... 264/82 X

FOREIGN PATENT DOCUMENTS

60-65759 4/1985 Japan .
60-166203 8/1985 Japan .

Primary Examiner—William R. Dixon, Jr.
Assistant Examiner—Andrew Griffis
Attorney, Agent, or Firm—Ernest D. Buff; Gerhard H. Fuchs

[57] ABSTRACT

A process is comprised of continuously producing a fine ceramic powder by drying at supercritical conditions. The feed is a sol of ceramic oxides or hydrous oxides which is continuously pressurized and heated to in excess of the critical temperature and pressure of the sol solvent. The solvent transforms to a gas and separates from the fine particulate ceramic oxide powder, which remains in a highly divided state.

21 Claims, 3 Drawing Sheets

CONTINUOUS PROCESS FOR PRODUCTION OF FINE PARTICULATE CERAMICS

BACKGROUND OF THE INVENTION

Ceramics have been receiving increasing attention for use in structural components. However, physical properties such as flexural strength or toughness are not always at the levels necessary in modern structural uses.

It has been noted that these properties often increase with increasing density of the ceramic components and attention is focusing on the production of ceramic products with densities approaching the theoretical density. Submicron ceramic powders are desirable because of their ability to give near theoretical density ceramic bodies upon sintering. High density ceramic bodies formed from submicron powders exhibit the superior mechanical strength and toughness required for ceramic materials used in severe environmental conditions.

Ceramic particles have long been obtained by ball milling or similar comminution methods. Such methods often provide wide particle size distribution and are extremely time and energy-consuming.

For the preparation of bimetal oxide ceramics such as perovskite materials, or solid solution phases such as $Y_2O_3/ZxO_2$, mixtures of these individual oxide powders are heated to high temperature to effect the formation of the bimetal oxide phase by solid state reactions. These solid state reactions are slow and require several heat-and-grind operations to effect homogeneity. Such operations are therefore expensive and introduce contaminants during the grinding processes. Contaminants degrade the mechanical properties of the final ceramic.

A much better method of making fine-grain and high purity ceramic oxide powders is via the hydrolysis of inorganic salts, acetates, oxycarbonates, oxalates, alkoxides etc. Hydrous oxides are prepared from an aqueous solution of a metal salt (or mixture of metal salts) precursor. The quality of the hydrolysis depends upon reaction conditions such as temperature, concentration, pH and mixing conditions. On the other hand, the quality of the ceramic oxide produced depends on the method of drying the solid. When the hydrous oxide sol is converted into a gel which is then dried at near-ambient conditions, the product is usually highly agglomerated as a result of the compressive forces applied by the liquid's surface tension. Such product materials must then be crushed to smaller grain size and do not produce useful dense ceramic materials.

U.S. Pat. No. 4,314,827 discloses a process for preparing a high density ceramic from a gel precursor by use of a sintering technique which collapses the gel into a more dense product. The gel-formed product is a continuous alpha alumina phase with a secondary stabilizing phase of either zirconia, an alumina-zirconia spinel or preferably mixture of zirconia and the spinel. The process involves the conversion of a stable sol or colloidal dispersion into a gel by drying an aqueous gel overnight at a temperature of approximately 90° C. The gel is then crushed to yield a desired product size of 0.5 millimeter or below. The crushed ceramic is then sintered to yield the desired high density ceramic for use as an abrasive. However, the ceramic has limited use due to the relatively large size of its particles.

U.S. Pat. No. 4,429,051 discloses the production of an alumina/zirconia ceramic from a sol precursor. The sol is produced, for example, by hydrolysis of zirconia/hydroxide which is admixed with an alpha sol or slurry followed by spray drying The spray drying step produces either a gel of zirconia alumina oxide or alumina oxide particles bonded together by zirconia oxide gel spheres depending on whether the alumina oxide is added to a zirconia sol as a sol or a powder respectively. This product is then further dried to yield a powder which is then milled, calcined and remilled to provide a relatively defined particle size product which provides a sintered ceramic with a relatively high fracture toughness.

It has additionally been disclosed in U.S. Pat. No. 3,637,407 to prepare pure alpha alumina from an alumina precursor powder prepared by vapor phase hydrolysis of aluminum isopropoxide. The patent discloses that the crystalline size of the alpha alumina is in the range of 0.5 to 1 micron which agglomerates into much larger clumps. The agglomerates require conventional, long time ball milling to reduce the particle size to yield a ceramic powder which upon sintering will exhibit high fracture toughness. Despite the ball milling, the resulting body has a density much less than theoretical density.

Spray drying has also been proposed, for an example, drying ceramic glass slurries in U.S. Pat. No. 4,552,852. In that process, fine particle size was obtained by directly wet milling the ceramic oxides for a period up to 10 hours or longer. Afterwards the wet milled slurry was spray dried.

It has also been proposed to produce silica gel by a continuous process, such as that disclosed by U.S. Pat. No. 2,868,280 to Sargent et al. The Sargent et al process requires special customized equipment to prevent plugging by the particulate material and has not been employed for production of fine particulate ceramics.

Japanese patent application No. 54-25523 discloses the production of fine grain zirconia ceramics by coprecipitating zirconia sols in an aqueous solution admixed with various optional stabilizing agents. Ammonia is the precipitating agent. The precipitate is filtered and resuspended in an organic solvent where it is made anhydrous by azeotropic distillation followed by drying to yield a stabilized zirconia powder with reported sintered bulk densities of 5.2 to 5.5 g/cm$^3$. Azeotropic distillation is also disclosed in U.S. Patent No. 4,365,011 to Bernard et al in which a sinterable zirconia percipitated directly from an alcohol solution with ammonium is washed with a hydrophilic solution and subjected to a drying azeotropic distillation with a solvent such as benzene which displaces the residual water.

U.S. Pat. No. 4,501,818 discloses an alcohol precipitation of zirconia sols in anhydrous ethanol with an alkaline metal hydroxide. The resulting precipitate is filtered, dried, washed with water, and dried again. The process allegedly reduced the filter clogging problems of Bernard while obtaining a zirconia fired density of 5.75 to 5.99 Mg/M$^3$. This process requires removal of the residual alkali metal (e.g., sodium) by either washing or precipitation in order to obtain a pure powder. This process is also burdened with the problem that a settled precipitate is formed as opposed to a sol, which is purposely avoided and involves multiple drying steps in a rather complicated and expensive overall process of limited applicability.

A majority of the proposed methods thus require extensive ball milling or complicated chemical processes to achieve the desired particle size. Those processes which propose using a ceramic sol generally require that the sol be transformed into a gel for further processing into a particulate powder. The art still awaits a simple process for transforming a sol directly and simply into a fine particulate ceramic powder or powder mixture which will yield high density ceramics upon sintering. Despite the activity in the art, there is also a gap in providing a process for producing a fine particulate ceramic powder directly from a sol or solution of the ceramic oxide which ceramic powder has a high pore volume, a high surface area and is able to achieve densities approaching that of theoretical upon sintering.

OBJECTS AND SUMMARY OF THE INVENTION

In one aspect of the present invention, there is provided a process for the continuous production of an extremely fine particle ceramic powder comprising forming a sol of a ceramic oxide or hydrous oxide having a liquid phase, pressurizing said sol above the critical pressure of the liquid phase, continuously feeding said pressurized sol into a heating zone, heating said pressurized sol in said heating zone to a temperature above its critical temperature wherein said liquid transforms to the gaseous state to form the fine particulate ceramic powder in a gaseous phase, discharging said ceramic powder and gas phase from said heated zone while undergoing substantially adiabatical expansion and separating the ceramic powder from said vapor phase.

Accordingly, it is a general object of the present invention to solve or substantially alleviate the above noted problems in the art.

It is a more specific object of the present invention to provide a process which is useful for directly converting a ceramic oxide sol or colloidal solution simply and efficiently into a fine particulate ceramic powder or powder admixture.

It is another object of the present invention to provide a process for forming a fine ceramic powder which is capable of sintering to near theoretical density.

It is another object of the present invention to provide a process for forming a high surface area, high pore volume ceramic oxide.

It is another object of the present invention to provide the product of those processes.

In one aspect of the present invention, there is provided a process for the continuous production of an extremely fine particle ceramic powder comprising forming a sol of a ceramic oxide or hydrous oxide having a liquid phase, pressurizing said sol above the critical pressure of the liquid phase, continuously feeding said pressurized sol into a heating zone, heating said pressurized sol in said heating zone to a temperature above its critical temperature wherein said liquid transforms to gaseous phase to form the fine particulate ceramic powder in a gaseous phase, discharging said ceramic powder and vapor phase from said heated zone while undergoing substantially adiabatical expansion and separating the ceramic powder from said vapor phase.

BRIEF DESCRIPTION OF THE DRAWINGS

The invention is further illustrated by the accompanying drawings in which.

DESCRIPTION OF THE PREFERRED EMBODIMENTS

Figure 1:
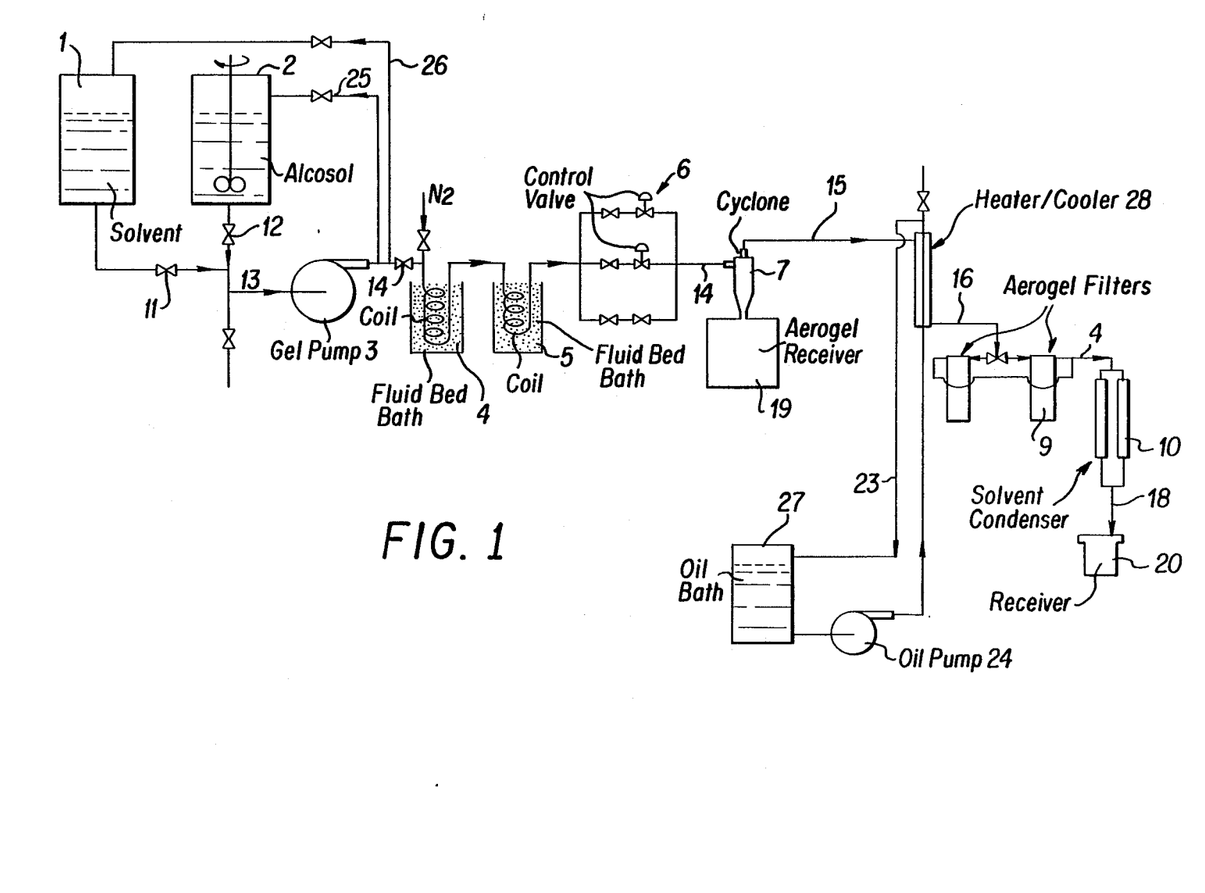
FIG. 1 is a flow chart showing the preferred method of making the ceramic powder of the invention.

FIG. 1 is for the purposes of illustration only and represents a preferred embodiment of an apparatus designed to practice the present invention. The apparatus in FIG. 1 includes feed tanks 1 and 2.

The feed used is preferably a sol of fine particulate ceramic oxides or hydrous oxides. Sols are liquid colloidal dispersions of finely divided particles in a liquid suspension. The solid phase of a gel has a particle size upper limit as a size below which gravitational settling is precluded. The lower limit of the colloid particle size is the theoretical distinction of a pure solution.

Sols used in the present process are formed by conventional type processes which provide a hydrous oxide or oxide of a ceramic. Such conventional methods include, for example, precipitation from inorganic salt solutions. Generally, the preferred, most widely available salts are the halide salts, particularly chloride salts, such as aluminum chloride, and zirconium oxychloride. However, other salts such as nitrates which react to form the oxide under the conditions of the present process are also useable.

Any base which will react with the salts and form a co-precipitable oxide mixture can be used. The preferred base is ammonia, particularly when the precipitation solution is water. The use of other solvent/base systems as would be known in the art are within the skill of the artisan, and include such amines as methylamine, ethylamine and the like or carbamides such as urea, acetamide and the like. Alkali metal bases could be used but left over alkali ions in the powder would be an unwanted contaminant that degrades the properties of the final ceramic.

Another exemplary source of the sol particles is the hydrolysis of various metal alkoxides, hydroxides, oxycarbonates, oxalates, etc . In a preferred embodiment, oxycarbonates or alkoxides are subject to hydrolysis in the presence of water to precipitate a hydrous oxide ceramic with a byproduct alcohol. Examples of the above ammonia precipitation and hydrolysis precipitations are set forth according to the following overall reaction schemes:

$$Al[OR]_3 + 2H_2O \rightarrow AlOOH + 3ROH \quad (1)$$

$$AlCl_3 + 3 NH_4OH \rightarrow Al[OH]_3 + 3NH_4Cl \quad (2)$$

$$Zr[OR]_4 + [X+2]H_2O \rightarrow ZrO_2 \cdot XH_2O + 4 ROH \quad (3)$$

$$ZrOCl_2 + 2NH_4OH + [X-1]H_2O \rightarrow ZrO_2 \cdot XH_2O + 2NH_4Cl \quad (4)$$

Although, for illustrative purposes, aluminum and zirconium metal salts and alkoxides have been set forth in equations (1)–(4) above, it will be understood that other metal salts and alkoxides can be employed. Metal salts or alkoxides of aluminum, zirconium, yttrium and mixtures thereof are well suited for structural ceramic applications. Metal salts or alkoxides of aluminum, yttrium, lanthanum, gadolinium, neodynium, chromium, europium, erbium, ytterbium, titanium, barium, copper, lead and mixtures thereof are especially suitable for electroceramic applications. Metal salts or alkoxides of aluminum and silicon are well suited for making creep resistant ceramics such as mullite.

The functional group R may be a straight or branched and aliphatic, cycloaliphatic or aromatic. Preferably, the group contains 1 to 12 carbon atoms and most preferably the group contains 1 to 4 carbon atoms. The moieties which can be present in the R group include a ketone, esters, amides, aldehydes, halogens, hydroxy groups, and ethers, etc. Preferably, the R group is chosen to provide a condensation product which is miscible with or identical to the solvent. However, the condensation product can be washed from the precipitation solvent which is formed or the solvent and condensation product can be washed free and replaced by a alternative solvent by the known methods in the art.

As noted above, sols prepared by precipitation of oxide precursors with a base is preferably conducted by the precipitation or coprecipitation of metal salts in an aqueous solution with ammonia. The use of an aqueous precipitation with ammonia requires a molar excess of ammonia to ensure complete reaction. The use of an excess is preferably within the range of from about 1 to about 300, preferably from about 10 to about 50, percent stoichiometric excess. The chloride ion, however, is detrimental to the subsequent ceramic product and must be removed either by washing with deionized water or a solvent with which the chloride has a distribution preference and/or is miscible with water or any other precipitation solution used.

The preparation of hydrous oxides via the hydrolysis of metal alkoxides has the advantage that washings are not required to remove unwanted byproducts such as chloride ions. However, the metal alkoxides are very expensive raw materials to use for ceramic power production. On the other hand, the need to wash the sol from anions such as the chloride ions in the preparation of powders from inorganic salts does add to the cost of ceramic powder production.

Whether the hydrous oxide sols are prepared from the hydrolysis of organometallic compounds or from base precipitation from metal salts is immaterial to the aerogel process. In either case the fluid may be an organic solvent such as alcohol or a mixture of water and an organic solvent that are, preferably, mutually miscible.

The sol following washing has a ceramic powder content of from about 1 to about 30, preferably from about 1 to about 6, weight percent to allow efficient pumpability to the subsequent drying process.

The washing of unwanted anions from an aqueous coprecipitation solution is generally accomplished by use of deionized water. Although other solvents or solutions can be used, deionized water is the least expensive alternative. Since the washings are conducted to remove the anions, the wash liquid preferably contains some water in order to avoid solubility problems Water-alcohol solvents could be used for the washings.

Where hydrolysis is the method employed for the production of a desired ceramic hydroxide, the corresponding alkoxide is the preferred ceramic precursor. Hydrolysis can occur in the liquid or vapor phase with or without an added inert solvent phase. For example, the ceramic hydrous oxides can be precipitated from an aqueous solution or from an organic solution containing suitable amounts of hydrolysis water. Preferably, if an aqueous/organic solution is used in the hydrolysis, the organic solution is miscible with water. It is also preferred that the condensation product of water with the organic radical from the alkoxide be miscible with either, or preferably both, the aqueous and organic solution. It is particularly preferred that the R radical forms an alcohol which is the same as the organic alcohol medium employed. Water is generally. present in at least a slight stoichiometric excess. The solutions must be sufficiently dilute to avoid gelling.

The ceramic hydrous oxide can be prepared prior to the drying step, such as by the purchase of commercial products. Preferably, however, the sol is prepared immediately prior to such steps in a continuous process. The drying is accomplished by a continuous process involving heating and pressurizing the sol to a temperature and pressure above the critical temperature and pressure of the sol liquid. The sol liquid at this temperature and pressure has a surface tension at or close to zero. The transformation of the sol liquid to a gaseous phase under these conditions occurs without substantial agglomeration of the solid particles. The powders formed are of a fine microparticle size range, generally from about 0.01 to about 10, often from about 0.5 to about 2, microns, which size particles are uniquely adapted for use in the preparation of modern, high-strength ceramics. These ceramics have near theoretical density and high flexural strength and fracture toughness.

The temperature and pressure at which the supercritical separation of powder from the liquid is effected depends primarily on the composition of the liquid phase. The critical point of water is 374° C. and 218.4 atm, while that of isopropanol, for instance, is 235° C. and 53 atm. The critical point of mixtures of water and isopropanol lies in-between the critical points of the individual components and is a smooth function of composition. For example, the critical point of a mixture with 50 mol % isopropanol is at about 265° C. and 78 atm. The behavior of other water-alcohol solutions is similar to that of the water-isopropanol system. Generally, the powder/fluid supercritical separation is carried out at about 0 to about 100, most preferably about 0° to about 50° C., above the critical temperature of the solvents. The pressure is generally from about 0 to 40, most preferably from about 0 to about 20 atm, above the critical point of the liquid.

In an alternative preferred embodiment, tank 2 contains a ceramic precursor and tank 1 contains the hydrolysis liquid. The sol is formed from the two streams from tanks 1 and 2 in line 13 which is in controlled fluid communication with tanks 1 and 2 via lines 11 and 12, respectively. Tank 2 can contains the precursor in a suitable organic phase with tank 1 containing the aqueous hydrolysis liquid with or without added organic solvent. In either event, the proportions of hydrolysis liquid to organic phase would have substantially the identical concentration ranges as a previously prepared sol.

Continuous hydrolysis involves the use of at least a molar excess of hydrolysis liquid with potentially greater amounts useable up to and included a dominant aqueous sol. If the dominant sol solvent is aqueous, the dispersing organic phase or the precursor should be miscible with the aqueous phase. Suitable adjustment in the subsequent drying step would have to be made to adjust for more than one gel solvent.

Drying can be performed continuously using apparatus schematically shown in FIG. 1. Sol which has been previously prepared is stored in tank 2 which is in fluid communication with a pump 3 via line 12. The pump 3 can be a high pressure diaphragm type displacement pump (gel pump) which raises the pressure of the sol to a level above the critical pressure or pressures of the sol solvent phase. The pressurized sol is then led via line 14 into constant temperature baths 4 and 5.

Conventional piston-type displacement pumps must run on clean, particulate-free fluids. To pump a slurry of particulates such as the gel of the present invention one must use a diaphragm pump in order to isolate the pumping mechanism from the suspended solids. We use a Teflon diaphragm to minimize product contamination from metallic debris arising from contact wear.

The temperature of the second bath is maintained at a temperature ranging from about 10 to about 100, preferably from about 20° to about 80° C. above the critical temperature of the sol liquid. The temperature of the first bath, if needed, can be set at any temperature between 50° and 250° C., or at the temperature of the second bath. As the sol is heated within the bath(s), its temperature is raised to a temperature above the critical temperature isotherm of the sol carrier solvent liquid. At this point, the surface tension of the sol liquid solvent approaches zero simultaneously with the transition of the solvent from the liquid phase into the gas phase. As the liquid enters the gas phase, the coprecipitated solid particles become a fine, free flowing particulate powder entrained in the vapor of the sol liquid.

The gas/solid two-phase system is passed to one or more control valves 6 where the system is preferably adiabatically expanded. The use of a conventional type control valve is possible without the plugging problems which would be expected in conventional continuous drying techniques. An exemplary conventional control valve would be a sliding stem control valve as is known in the art. The choice of an acceptable valve is not critical and would be within the skill of an artisan. Care must be taken and heat added, if needed, to ensure that the adiabatically expanded gas remains above its dew point to avoid condensation of liquid onto the solid particles, in other words the vapor stream must be maintained in superheated state.

The adiabatically expanded solid entrained in the superheated vapor is sent to one or more conventional cyclone separators for the separation of a portion of the powder from a vapor. The cyclone can be externally heated to avoid any incidental heat loss which may cause a recondensation of the vapor phase. This can be accomplished by any conventional method such as jacketing the cyclone and supplying the annular space defined by the jacket with a heated recirculating fluid or heated waste gasses. Alternatively, the cyclone can be heated with an external coil heater or plate heater. The cyclone can also be insulated, which would prevent heat loss as well as reduce the noise level in the industrial setting.

The cyclone discharges the solids from its discharge apex into a receiver 19. The vapor with possibly a minor carryover of ceramic powders exits line 15 via the cyclone axial overflow outlet. The exit line 15 can be jacketed by a heater/cooler 28 to bring the temperature to an appropriate level for final removal of residue powders via filter 16. The temperature of the vapor is preferably below the maximum allowable temperature for the filters 16 which temperature can be maintained by the heater/cooler 28. The filter 16 removes any carryover ceramic powders from the vapor stream.

The aerogel filters are cartridge-type filters made from pleated micro-fiberglass media that have nominal retention efficiency of 0.2 u. The maximum operating temperature for these media is 120° C. They are batchtype filters that need to be cleaned and refitted with new cartridges periodically.

Instead of the cyclone, the process could be operated with self-cleaning bag house filters. Bag house filters made of Teflon with a higher temperature rating (say, 230° C.) could then be used to collect most (better than 99%) of the ceramic powder from the gaseous phase. Such filters would probably make the use of the cartridge filters and the heater/cooler system redundant, thus further simplifying the process.

The filtered vapors from the filters 16 are preferably condensed in a conventional solvent condenser. The solvent is then available in essentially solid free form for immediate recycle or subsequent separation or purification followed by either recycle or other appropriate disposal.

Tank 22 is a holding tank for a recirculating heat transfer liquid. The liquid is heated or cooled in the tank to bring its temperature to the appropriate temperature level for proper operation of heater cooler 28. While the Figure shows a countercurrent heat transfer, a concurrent heat transfer arrangement or other conventional arrangement would also be appropriate.

The ceramic powders obtained from the present process are very fine-grained, e.g., generally 100% less than about 10, often less than about 3, microns and are readily suitable for consolidation by conventional pressing and/or sintering techniques to form ceramic bodies of very high densities (e.g., generally at least about 98, often at least about 99,% of theoretical density) without the need for extensive post-consolidation processes (e.g., HIP treatment). Such highly dense bodies possess substantially enhanced mechanical properties such as flexural strength and toughness.

For purposes of further illustration, the process of the invention and the product obtained thereby are illustrated in the following specific examples. These examples are considered to be illustrative only and are not intended to limit the scope and content of the invention or obvious variations thereover.

EXAMPLES

Example 1

3.472 kg of aluminum isopropoxide (AIP) was dissolved in 12.5 liters of isopropanol maintained at 65° C. Hydrolysis of AIP was accomplished by the slow addition of water/methanol (922 cm$^3$ water and 3,125 cm$^3$ of methanol) solution under continuous high speed stirring over 30 minutes. This produced about 5 gallons of alumina gel dispersed in the alcohol-rich fluid. A portion of the gel was run through the continuous process shown in FIG. 1. The pumping rate was about 3 gph and the average conditions at the inlet to the control valve 6 were 292° C. and 76 atm. 317.7 g of powder (AG9874) was collected from the cyclone receiver 17 and the aerogel filters 9. The product powder characteristics are given in Tables I and II and FIG. 2.

Example 2

3.5 liters (3.675 kg) of zirconium n-propoxide (TPZ) was diluted with a solution of 8.02 liters isopropanol and 5.635 liters n-propanol under rigorous, continuous stirring. 1.5 g of p-hydroxybenzoic acid was added to the resultant solution under stirring. Hydrolysis of TPZ was accomplished by the addition of a solution of 455 cm$^3$ water and 2,275 cm$^3$ n-propanol at the rate of 60-70 cm$^3$/minute. This yielded about 5 gallons of zirconia gel at approximately 8 wt % solids. A portion of this gel was run through the continuous flow system of FIG. 1, yielding 671.4 g of powder (AG9881) at the average temperature of 289° C. at the inlet control valve 9 and pressure of 76.7 atm. Powder properties are given in Tables I and II.

Example 3

Coprecipitation of yttria/zirconia powders from chlorides and oxychlorides

Figure 3:
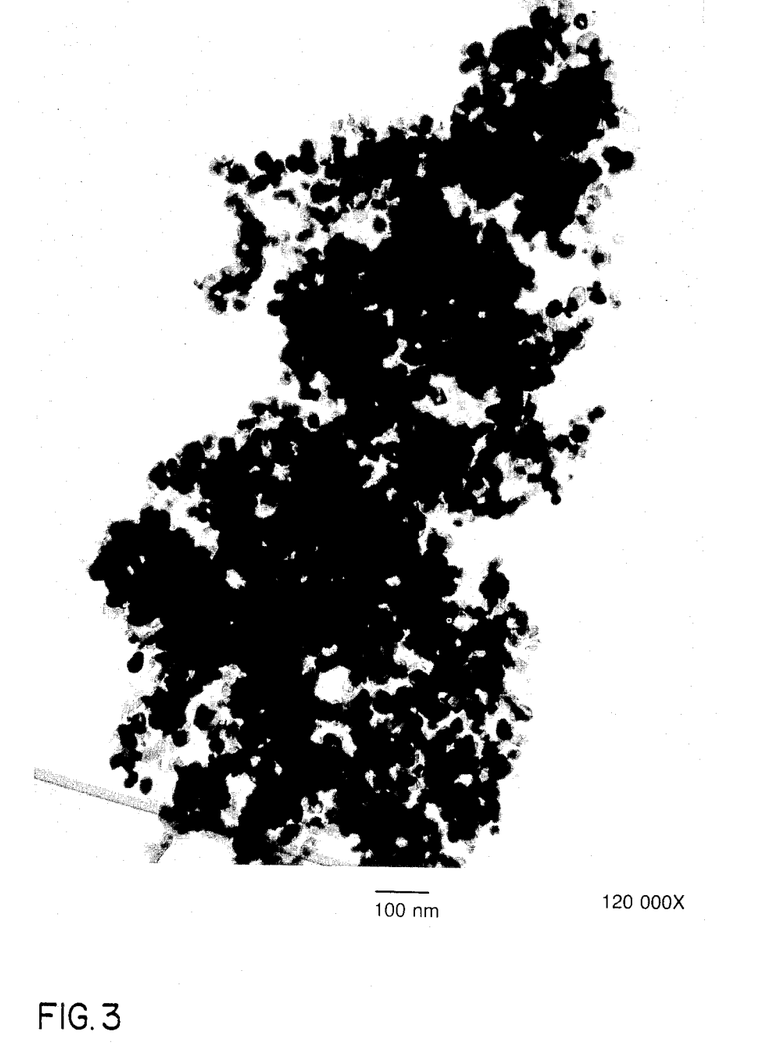
FIG. 3 is a TEM photomicrograph of calcined zirconium powder produced in accordance with the invention.

Solution I is made up of 3 kg of zirconium oxychloride solution (20 wt % ZrO$_2$), 112.8 g of yttrium chloride solution (25 wt % Y$_2$O$_3$), and 1,888 g of deionized (DI) water. Solution II is made up of 850 g concentrated ammonium hydroxide solution (29 wt % NH$_3$) and 4,150 g DI water. The coprecipitation was done in a 5 gallon tank, which was initially loaded with 4 kg DI water and 10 cc of concentrated ammonia, by pumping Solution I and Solution II at the rate of 100 g/minute each into the turbulent region created by a 3" turbine mixer. During the solution addition, the pH of the slurry remained constant at 9.2 and the stirring speed was increased from 1000 to 2000 rpm. Stirring was continued for an additional 30 minutes after solution addition was completed. The resultant yttria/zirconia gel was washed four times with sufficient deionized water to reduce chloride ion concentration to 0.2% of its initial value. The washed gel was diluted with isopropanol to 20 wt % H$_2$O. A portion of the gel in the water/isopropanol mixture was run in the continuous process of FIG. 1 to yield 580 g of yttria/zirconia powder (AG9919) at average temperature and pressure of 320° C. and 102 atm, respectively, at the inlet of port of the control valve. Physical properties of the as-produced powder are given in Tables I and II. This powder can be calcined to remove residual organics and to crystallize it or coarsen the crystallite size. FIG. 3 shows tetragonal zirconia crystallites of powder AG9919. This material is very sinter reactive and sinters to 99+% theoretical density at 1375° C.

Example 4

Zirconium n-propoxide was hydrolyzed as per Example 2 except that the quantity of water used corresponded to 4 mols of water per g-atm of zirconium. The gel was run through the system of FIG. 1 at 300° C. and 75 atm. 1100 g of zirconia powder (AG9895) was obtained, the physical properties of which are listed in Table III.

Example 5

Instead of hydrolyzing TPZ in a batch system as per Examples 2 and 4 and then running the gel through the system of FIG. 1, the hydrolysis can be accomplished on-line, thus further simplifying the process of making ceramic powders from alkoxides. Tank 2 in FIG. 1 was loaded with a solution of 3.2 liters TPZ in 15.1 liters of n- and isopropanols (1:1 by volume) after pruging with N$_2$ to remove water vapor. This solution was pumped into the system by pump 3 and hydrolyzed by a water solution in isopropanol fed just after valve 14 by another high pressure metering pump (not shown in FIG. The flow rate of the aqueous stream was such that a ratio of 4 mols of water to 1 g-atm of zirconium prevailed at the stream junction. Mixing of the TPZ and water streams was achieved by a 3/16" Kenics™ in-line mixer. Temperature and pressure in the system were the same as those in Example 4. 460 g of zirconia powder (AG9904) was collected, which unexpectedly had a lower carbon content than the powder of Example 4 indicating improved degree of hydrolysis, as the data of Table III show.

Example 6

96 g of zirconia powder were produced under the conditions of Example 5 (AG9905). Again, the product had a lower carbon content as the data of Table III show.

Example 7

Coprecipitated yttria/zirconia powder with 4.5% yttria was prepared according to methodology described in Example 3. The resultant powder was calcined and dry ball-milled to break up agglomerates. This powder was then isostatically pressed into disks which were sintered for 1 hr at selected temperatures. The density of the sintered disks was measured by the Archimedes method and the results are plotted in FIG. 5. These data show that the powder produced by the present invention is very sinter reactive with the maximum densification rate being about 1150° C. and near complete densification being achieved below 1400° C.

The powders produced by the present process display an extremely high surface area and pore volumes as is disclosed in Table I for Examples 1-3 above. The high surface area for the most part is a direct result of the extremely fine particle sizes that are obtained by the present invention.

TABLE I

| | Center Powder Physical Properties | | |
|---|---|---|---|
| Material | Starting Material | Pore Volume (cc/g) | Surface Area (m$^2$/g) |
| Alumina (AG9874) | Aluminum Isopropoxide | 4.6 | 1084 |
| Zirconia (AC9881) | Zirconium Propylate | 0.92 | 400 |
| Yttria/Zirconia (AG9919) | Oxychlorides | 1.78 | 205 |

The particles collected from both the cyclone receiver and the filters are of a particle size range of from 0.01 to 10 microns, but predominantly from 0.05 to 2 microns. The particles are formed by the weak agglomeration of smaller submicron particles in the nanometer dimensional size range. The results are displayed in Table II, for examples 1-3 above.

TABLE II

| Ceramic Powder Particle Size Distribution | | | |
|---|---|---|---|
| Cumulative Distribution (%) | Particle Size (μm) | | |
| | Alumina (AG9874) | Zirconia (AG9881) | Yttria/Zirconia (AG9919) |
| 33 | 0.66 | 0.6 | 0.48 |
| 50 | 1.0 | 0.8 | 0.7 |
| 67 | 1.7 | 1.0 | 1.0 |

Figure 2:
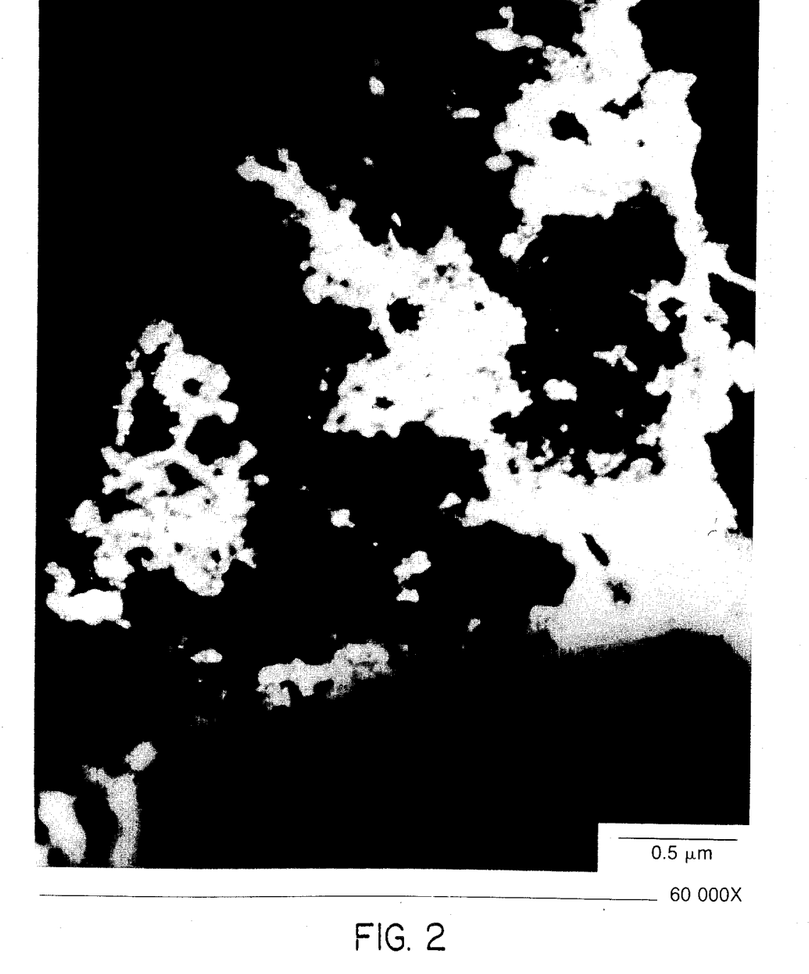
FIG. 2 is a transmission electron microscopy (TEM) photomicrograph of an alumina powder produced according to the invention.

Although agglomeration is present, generally the agglomeration is held together by extremely weak van der Waals forces. The agglomerates are therefore readily dispersed into smaller agglomerates and constituent particles in a liquid. The transmission electron microscopy photomicrograph of FIG. 2 shows the as-produced alumina powders of Example 1. This figure shows the small agglomerates formed in the present process.

As can be seen in Examples 5 and 6, the on-line hydrolysis of the ceramic oxide precursor yields product zirconia powders having a smaller aggregate particle size distribution of a higher purity. The results of which are displayed in Table III. Specifically, the amount of residual carbon is markedly lower than the previously prepared sol process. It is not specifically known why the on-line hydrolysis results in smaller particle aggregates. However, on line hydrolysis is more efficient and results in a product of higher purity, i.e. a powder with less residual carbon.

TABLE III

Ceramic Powders from Batch and On-Line Hydrolysis of Alkoxides at Room Temperature

| Zirconia Sample | $H_2O$:Zr | Surface Area ($m^2/g$) | Pore Volume (cc/g) | Particle Size Distribution (microns) | | |
|---|---|---|---|---|---|---|
| | | | | 33% | 50% | 67% |
| AG9895 | 4 | 390 | — | 0.74 | 0.84 | 1.00 |
| AC9904 | 4 | 308 | 3.34 | 0.44 | 0.5 | 0.6 |
| AG9905 | 4 | 332 | 3.57 | 0.35 | 0.44 | 0.6 |

| Zirconia Sample | Carbon wt % | Hydrogen wt % | Hydrolysis |
|---|---|---|---|
| AG9895 | 6.62 | 1.73 | Batch |
| AG9904 | 4.16 | 1.37 | On-Line |
| AG9905 | 3.62 | 1.20 | On-Line |

Powders produced by the present process are then subjected to conventional calcining and sintering to yield sintered bodies having up to 99+% of theoretical density with a fine microstructure and excellent mechanical properties.

FIG. 3 shows a TEM photomicrograph of a calcined zirconia powder in which the crystallite size is less than 500Å.

Other embodiments of the invention will be apparent to those skilled in the art from a consideration of this specification or practice of the invention disclosed herein. It is intended that the specification and examples be considered as examples only, with the true spirit of the invention being indicated by the following claims.

I claim:

1. A process for the continuous production of an extremely fine particle ceramic powder comprising forming a sol of a ceramic oxide or hydrous oxide having a liquid phase, pressurizing said sol above the critical pressure of the liquid phase, continuously feeding said pressurized sol into a heating zone, heating said pressurized sol in said heating zone to a temperature above its critical temperature wherein said liquid transforms to a gaseous phase and forms a fine particulate ceramic powder suspended in the gaseous phase, discharging said ceramic powder and gaseous phase from said heated zone while undergoing substantially adiabatical expansion and removing the ceramic powder from said gaseous phase.

2. The process of claim 1 wherein the sol is formed by hydrolysis of a metal alkoxide.

3. The process of claim 2 wherein the hydrolysis is performed continuously by admixing an aqueous stream with an alkoxide stream.

4. The process of claim 1 wherein the sol is formed by precipitation of precursor metal salts with a base followed by washing to remove the salt anion and/or other byproducts.

5. The process of claim 4 wherein the metal salt is a salt of aluminum, zirconium, hafnium, yttrium or mixtures thereof, and said base is ammonia.

6. The process of claim 1 wherein said sol is an alumina sol, a zirconia sol, or a yttria/zirconia sol.

7. The process of claim 1 wherein said ceramic powder is removed from said gaseous phase in the form of a vapor stream by a cyclonic separator adapted to discharge said ceramic powder from a discharge apex and the gaseous phase is discharged by a cyclone axial overflow outlet.

8. The process of claim 7 wherein the vapor stream from cyclone axial overflow outlet is filtered to further remove ceramic powders and said filtered stream is condensed for further use.

9. The process of claim 1 wherein the sol has a ceramic oxide or hydrous oxide content of 1 to 30 percent.

10. The process of claim 1 wherein said ceramic powder is removed from said gaseous phase by a bag-house filter equipped with filter bags having a temperature rating of about 230° C. and powder retention characteristics.

11. The process of claim 4 wherein the metal salt is a salt of aluminum, yttrium, lanthanum, gadolinium, neodymium, chromium, europium, erbium, ytterbium, titanium, barium, lead and mixtures thereof, and said base is ammonia.

12. The process of claim 2 wherein said metal alkoxide is an alkoxide of aluminum, zirconium, hafnium, yttrium, alkoxide or mixtures thereof.

13. The process of claim 12, wherein the hydrolysis is conducted continuously by admixing an aqueous stream with an alkoxide stream.

14. The process of claim 2 wherein the metal alkoxide is an alkoxide of aluminum, yttrium, lanthanum, gadolinium, neodymium, chromium, europium, erbium, ytterbium, titanium, barium, copper, lead and mixtures thereof.

15. The process of claim 14, wherein the hydrolysis is conducted continuously by admixing an aqueous stream with an alkoxide stream.

16. The process of claim 2 wherein the metal alkoxide is an alkoxide of aluminum, silicon or mixtures thereof.

17. The process of claim 16 wherein the hydrolysis is conducted continuously by admixing an aqueous stream with an alkoxide stream.

18. The process of claim 4 wherein the metal salt is a salt of aluminum, silicon or mixtures thereof.

19. The process of claim 1 wherein the sol is an alumina sol, a silica sol, or mixture thereof.

20. The process of claim 1 wherein the liquid phase is water, or mixtures of water with organic alcohols in which the hydrocarbon chain has 1 to 12 carbon atoms.

21. The process of claim 21 wherein said hydrocarbon chain has 1 to 4 carbon atoms.

* * * * *

UNITED STATES PATENT AND TRADEMARK OFFICE
CERTIFICATE OF CORRECTION

PATENT NO. : 4,845,056
DATED : Jul. 4, 1989
INVENTOR(S) : Jean Yamanis

It is certified that error appears in the above-identified patent and that said Letters Patent is hereby corrected as shown below:

Column 6, line 67, "or" should read ---for---.

Column 10, line 4, after "FIG" add ---1).---.

Column 10, line 48, "(AC9881)" should read ---(AG9881)---.

Column 11, line 29, "(AC9904)" should read ---(AG9904)---.

Column 11, line 44, "500Å" should read ---500 Å---.

Column 12, lines 16-17, delete "in the form of a vapor stream".

Column 12, line 19, after "phase" insert ---, in the form of a vapor stream,---.

Column 12, line 21, after "stream" insert ---,---.

Column 12, line 22, after "from" insert ---said---.

Column 12, line 23, after "filtered" insert ---vapor---.

Column 12, line 61, delete "organic".

Signed and Sealed this

Twenty-second Day of May, 1990

*Attest:*

HARRY F. MANBECK, JR.

*Attesting Officer*  *Commissioner of Patents and Trademarks*